United States Patent [19]
Dunn

[11] 3,769,065
[45] Oct. 30, 1973

[54] METHOD OF COATING PERLITE AND PRODUCING MATERIALS OF CONSTRUCTION

[76] Inventor: Daniel K. Dunn, R.R. No. 1, P.O. Box 325, Kankakee, Ill. 60901

[22] Filed: Dec. 6, 1971

[21] Appl. No.: 205,201

[52] U.S. Cl............. 117/54, 117/100 B, 117/100 S, 117/105.3, 117/123 A, 181/33 G, 181/33 GA
[51] Int. Cl............................................... B44d 1/08
[58] Field of Search............... 117/54, 100 S, 100 B, 117/100 D, 137, 138, 126 GF, 126 AF, 105.3, 123 A; 106/74, 84; 181/33 G, 33 GA

[56] References Cited
UNITED STATES PATENTS

| | | | |
|---|---|---|---|
| 2,971,861 | 2/1961 | Reese et al. | 117/54 |
| 2,919,202 | 12/1959 | Ekedahl et al. | 106/84 X |
| 2,541,273 | 2/1951 | Myers | 117/126 AF |
| 3,103,254 | 9/1963 | Stedman | 117/137 X |

*Primary Examiner*—Alfred L. Leavitt
*Assistant Examiner*—Caleb Weston
*Attorney*—David D. Kaufman

[57] ABSTRACT

A method of coating expanded perlite wherein the material is first sprayed with an acid solution, next sprayed with a waterglass solution, and then sprayed with an acid solution. Also disclosed are an apparatus for practicing the method and products made with the coated expanded perlite.

13 Claims, 2 Drawing Figures

METHOD OF COATING PERLITE AND PRODUCING MATERIALS OF CONSTRUCTION

This invention relates to the use of perlite as a construction material and more particularly to a method of coating expanded perlite and making construction materials therefrom.

Perlite is a naturally-occurring mineral sometimes referred to as volcanic glass. When heated, the individual particles of perlite pop or expand into lightweight cellular bodies or granules. Because of its extremely light weight, high fire resistance and good thermal and sound insulating properties, the great potential of expanded perlite as a construction material has long been recognized. However, these desirable characteristics are nullified to a great extent by the extreme softness and crushability of expanded perlite which likewise imparts a very low modulus of rupture to structures molded or pressed therefrom, such as an acoustical tile.

Numerous attempts have been made to improve the hardness of expanded perlite to render the same more suitable as a material of construction. In recent years, many of these attempts have involved the use of water-soluble alkali metal silicates which are applied in liquid form and are intended to leave a glass-like coating on the individual cells after the treated perlite is baked or otherwise dried. However, due to the hygroscopic character of the untreated expanded perlite, the liquid silicate was substantially absorbed into the individual cells so that little, if any, external coating remained. Thus, such treatment gave only limited improvement in the desired characteristics of water resistance, flame resistance, sound insulation, and hardness. For example, when expanded perlite so treated was molded into acoustical tiles or the like, the tiles were found to be deficient in sound insulating qualities and relatively unstable, both physically and chemically, under normal conditions of use and weathering.

Attempts have likewise been made to prevent absorption of the liquid silicates into the perlite cells. In one approach to this problem, the expanded perlite first was treated with another water-repellant composition or binder such as silicones, whose theoretical purpose was to fill the pores or interstices in the expanded perlite cells. To my knowledge, coated perlite produced by such techniques has been characterized by some or all of the same shortcomings. Another approach has been to employ an acid or acidic precipitant simultaneously with, or subsequent to, the treatment with silicate, which reacts chemically with the basic alkali metal silicate. While the acidic substances may have resulted in a material of greater chemical stability, little, if any, improvement was noted in insulating and strength characteristics.

Therefore, principal objects of my invention are to provide an improved coated expanded perlite material and a method of making same, which material is harder and more stable, both chemically and physically, and which has greatly improved moisture and thermal resistance.

Additional problems were encountered with prior methods of coating expanded perlite because of the softness and hygroscopic nature of the material. These undesirable characteristics frequently dictated that the material could be made only by a batch process for immediate use. Since storage of the material was not feasible, potential uses thereof were limited. Examples of such precluded applications include the mixing with traditional wall and ceiling coating material, such as plaster of Paris, or the blending together of two or more different size grades of coated expanded perlite to achieve a strong, non-warping and physically and chemically stable tile.

Therefore, it is another object of the invention to provide a method of making coated perlite which may be efficiently practiced on a continuous basis. A related object is to provide a coated perlite material which may be safely and easily stored for future use as required.

Previously, with the use of a water-soluble silicate like sodium silicate alone, simultaneous with, or prior to, the application of an acidic precipitant or gelling agent, it was found that excessive heat or heating periods were required to completely dry or cure the treated perlite. It is theorized that this was attributable to the fact that the sodium silicate in liquid form penetrated or saturated the perlite cells rather than coating the exteriors as intended. As a result, complete evaporation of the alkali in the sodium silicate solution was rendered more difficult. Such excessive heat sometimes likewise resulted in sublimation or other decomposition of the acid-base neutralization product or undesirable discoloration of the coated perlite material or building unit formed therefrom.

It is therefore another object of the invention to teach a method of coating expanded perlite, and a coated perlite material, which requires lower temperatures and shorter periods of exposure to heat for complete curing of the material or products formed therewith.

Other objects of the invention are to teach a method of coating perlite which employs relatively inexpensive and readily available raw materials and produces an improved coated product usable as a basic building material in a variety of applications.

I have discovered that the treatment of expanded perlite particles by moistening the same with an acid prior to the application of the glass coating material produces a coated perlite which substantially eliminates the shortcomings described above. Accordingly, this invention teaches a first step of applying to the expanded perlite particles an acid to moisten the same, a second step of applying a water-soluble silicate such as sodium silicate, a third step of again applying an acid and a fourth step of baking or curing the coated material to substantially complete dryness. Preferably, the acid comprises an aqueous solution of acetic acid although other mineral and organic acids such as hydrochloric, phosphoric, nitric, sulfuric, boric, formic, propionic, butanoic, malic, citric, and the like, may also be employed. Preferably too, the acid employed in steps one and three will be the same. The resulting coated perlite may be used immediately or conveniently stored for future use.

The invention teaches the use of a fine grade of coated perlite so formed by mixing with known wall or ceiling coating materials to improve their physical characteristics. The invention likewise further teaches the use of a coarser grade of coated perlite, in mixture with the finer coated perlite, for forming superior construction units like acoustical titles. In such cases, the complete process already described is repeated on the stored coated perlite with the exception that the tiles or other forms are made after step three and then cured by heat.

Figure 1:
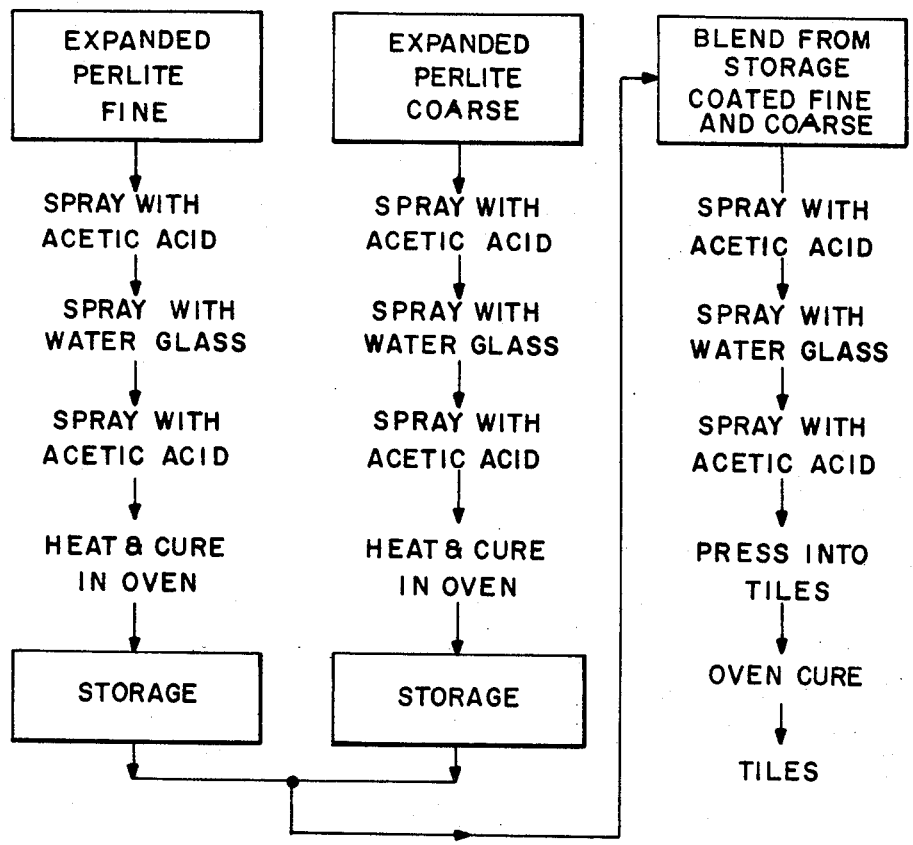
FIG. 1 is a flow diagram showing the steps of the method.

The steps of the method may be best understood be referring to FIG. 1 in connection with the following description. The starting material is expanded perlite which may be of any desired size grade. For convenience of description, two different grades will be described as "fine" and "coarse," corresponding to two grades of commercially available expanded perlite.

Considering first the fine expanded perlite, the uncoated perlite particles are first contact-treated or moistened, as by spraying, with a mineral or organic acid selected from the group consisting of acetic, hydrochloric, phosphoric, nitric, sulfuric, boric, formic, propionic, malic and citric. The acid-washed perlite is next treated with a water-soluble alkali metal silicate and the material is thereafter treated again with an acid solution, preferably the same one used in the first step. The coated perlite particles are baked or cured in an oven to substantially complete dryness after which the material may be conveniently stored in bins or silos or used immediately in a manner to be subsequently described.

Among the acids listed, I prefer to use a solution of acetic acid which may vary in concentration from 10 –40 percent weight but preferably is around 30 percent. The concentration of the acid solution affects the gelling time of the silicate and it has been found that the 30 percent solution gives best results. Similarly, the amount of acid employed will affect gelling. Thus, too much acid may result in excessive gelling of the silicate which traps water within the perlite cells and may cause the cells to burst upon heating, thereby defeating the purpose of the entire coating method. Preferably, the amount of 30 percent acetic acid used is around 4 ounces per cubic foot of expanded perlite and the amounts used in steps one and three are the same.

I likewise prefer to use a sodium silicate solution, commonly known as waterglass, as the coating material in step two. The general empirical formula for sodium silicate is $Na_2O \cdot xSiO_2$ and the ratio of sodium oxide to silica can be varied to influence the alkalinity or silica content of the solution. I have found that commerically available sodium silicate solutions having a Baume of from 40 to 45 and from 35 to 40 percent solids are suitable, although a solution of around 37.5 percent solids and Baume 42 is preferred. With regard to the proportions of water-glass and perlite I have found that approximately ½ gallon waterglass per cubic foot of perlite is preferred, although the proportions may be varied slightly depending upon the particle size of the starting material.

In the heat curing stage, the material is heated to temperatures of approximately from 720°F. to 750°F. for a period of around 8 minutes to insure substantial evaporation of the alkali. Thereafter, temperature of the material is lowered to temperatures around 480°F. to 500°F. for about 10 minutes. This heat treatment, which may be carried out in an infra red oven, results in elimination of substantially all moisture. After drying, the coated perlite may be used immediately or conveniently stored for future use.

Size specifications for the fine perlite particles both uncoated and coated are shown in the following table:

| U.S. Screen | Uncoated Fine | Coated Fine |
| --- | --- | --- |
| 20 | 0.0–0.4% | 0.0–1.0% |
| 30 | 0.0–2.8% | 0.0–5.0% |
| 50 | 50.0–75.0% | 60.0–80.0% |
| 100 | 30.0–45.0% | 20.0–30.0% |
| above 100 | 3.0–28.0% | 0.0–2.0% |

The coated fine perlite made according to the invention has sufficient hardness to permit storage in bulk quantities without breaking or crushing the individual cells, which are likewise substantially water and fire resistant. When mixed with known masonry coatings, such as plaster of Paris or the like, highly beneficial results are observed. As an example of such use, I have prepared a blend of approximately four parts coated fine perlite and nine parts of a masonry coating material sold commercially by Sta-Dri, Inc. and described in U.S. Pat. No. 2,757,159. Masonry surfaces made with this blend have been found to resist temperatures up to 3,000°F for up to 90 minutes without noticeable discoloration, flaking or crumbling. Water resistance is, if anything, improved and the ability to hold paint and other decorative coatings in no way diminished.

As already indicated, the method of the invention may be applied to expanded perlite of any grade. A commercially available coarse expanded perlite is coated by the identical method and has the following particle specifications:

| U.S. Screen | Uncoated Coarse | Coated Coarse |
| --- | --- | --- |
| 8 | 0% | 0.0–4.0% |
| 16 | 0.2–2.8% | 1.0–5.0% |
| 30 | 60–0–75.0% | 60.0–80.0% |
| 50 | 10.0–25.0% | 15.0–35.0% |
| 100 | 3.0–12.0% | 0.0–trace |
| above 100 | 3.0–12.0% | 0.0–trace |

The finished product comprises relatively large and predominantly uniform cells which are sufficiently hard to withstand storage in bulk without crushing. This product could be formed directly into molded units like tiles, but the tiles would have a relatively low modulus of rupture absent some filler or binder material of smaller particle size. In order to produce tiles of uniform strength, stability, color and insulating properties, it is necessary to consistently employ a reproducible blend of fine and coarse coated perlite. An important advantage of the invention is that the fine and coarse coated perlite which have been stored may be readily blended to give the required consistency so that uniform and improved tiles can be produced.

An acoustical or ceiling tile of general indoor or outdoor applications is formed with a blend of fine and coarse coated perlite particles having the following specifications:

| U.S. Screen | Blend of Coated Fine and Coarse |
| --- | --- |
| 8 | 0.0–1.0% |
| 16 | 0.25–5.0% |
| 30 | 60.0–80.0% |
| 50 | 50.0–75.0% |
| 100 | 5.0–15.0% |
| above 100 | 0.0–1.0% |

After the blend of fine and coarse perlite has been made, the same is used as a starting material and steps one, two and three of the coating method repeated thereon. The still-moist material is charged into molds where it is subjected to appropriate pressures to form tiles. The tiles are then heat-cured as previously described in connection with the coated perlite.

Tiles formed according to the invention have been found to be extremely stable, physically and chemically, to exposure and weathering and to exceed prior perlite-base tiles in these qualities as well as in breaking strength. For example, my tiles were tested for comparison with tiles of identical standardized dimensions, e.g. 12 inches by 12 inches by 7/8 inch, made according to the teachings of U.S. Pat. No. 3,103,254. Whereas 46 pounds of pressure were required to break one of my tiles, the prior art tiles broke under pressure of only 28 pounds. As a measure of chemical and physical stability, the tiles were placed in boiling water and the pH measured. After 8 minutes, the prior art tile began to physically deteriorate and the pH value was 11.5. With one of my tiles, the pH after thirty minutes was 9.0, and after twenty four hours the pH was 10.4 and there was no observable deterioration.

Precise reasons for the superior results obtained by the invention and the exact physical and chemical nature of the coated perlite are not fully understood. It may be theorized that the initial moistening treatment with an acid results in absorption of some or most of the acid by the expanded perlite cells. The absorbed acid apparently prevents penetration of the cells by the sodium silicate and furthermore reacts chemically to cause partial neutralization and gelling, which is then completed by the second acid treatment. Where the preferred raw materials are employed, viz., acetic acid and sodium silicate, a probable reaction product is sodium acetate which is a highly stable salt and does not adversely affect the stability of the coated perlite.

Figure 2:
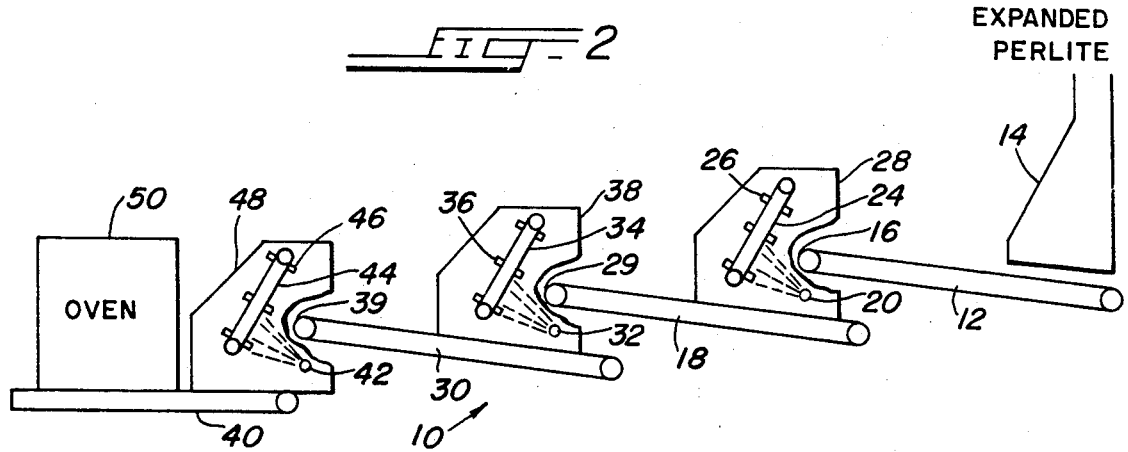
FIG. 2 is a simplified schematic drawing illustrating a form of apparatus for practicing the method.

One of the important advantages of the invention is that the same permits practice of the method on a continuous rather than batch process basis as required by prior art methods. A new apparatus for efficiently practicing the method is illustrated schematically in FIG. 2 of the Drawings.

Apparatus 10 comprises a conveyor line having a hopper 14 at one end thereof for feeding the expanded perlite raw material. Hopper 14 is positioned adjacent the trailing portion of a first conveyor belt 12 and is provided with an adjustable bar or gate (not shown) overlying the conveyor belt for automatically leveling the load of expanded perlite carried by the conveyor. Conveyor 12 terminates at a leading edge 16 which results in the carried material falling freely therefrom.

Second conveyor 18 is positioned below end point 16 of conveyor 12 and is adapted to receive the material falling therefrom. Spray means 20 are positioned between the conveyors 12 and 18 and are adapted to apply a spray of acid to the falling material. As the material falls through the acid spray, the velocity of the sprayed acid will tend to carry some of the material with it. A baffle 24 is positioned to catch such material and is provided with a continuous motion wiper means 26 for wiping the slightly dampened and clinging material from the baffle so that it falls down onto the second conveyor 18. Hood 28 encloses the spraying area and the same is provided with an adjustable gate or the like for automatically controlling the level of the material carried by conveyor 18.

In similar fashion, a third conveyor 30 is positioned beneath the leading edge 29 of the second conveyor 18, and there is again provided spray means 32, a baffle 34 having wiper means 36 and a hood 38 having automatic leveling means. Spray means 32 is adapted to apply the waterglass to the acid-moistened perlite.

Beneath the leading edge 39 of third conveyor 30, there is positioned a fourth conveyor 40, spray means 42 adapted to apply the second acid rinse, a baffle 44 provided with continuous-motion wiper means 46, and a hood 48.

The conveyor 40 is adapted to carry the moist coated perlite into an oven 50 provided with suitable heat sources and temperature regulation means where the continuously moving material is dried and cured. Conveyor 40 may then be arranged to carry the finished coated perlite to an area for immediate use or storage.

It will be appreciated that the apparatus 10 thus provides a most efficient means for continuously manufacturing coated perlite according to the invention. The novel arrangement of conveyors and utilization of spray means for applying the liquids to the freely falling particulate perlite likewise eliminates the use of agitators or rotating mixers of the type heretofore required. Such mixers were not only inefficient but further caused considerable undesirable crushing of the perlite cells.

I claim:

1. A method of forming coated and sealed expanded perlite particles characterized by the steps of:
    first applying to expanded perlite particles an aqueous acid solution;
    next applying to the moistened particles an aqueous solution of sodium silicate;
    next applying to the moistened particles an aqueous acid solution; and
    then drying the particles,
    said acid solutions being selected from a group consisting of acetic, hydrochloric, phosphoric, nitric, sulfuric, boric, formic, propionic, butanoic, malic, and citric acids,
    the concentrations and proportions of said acid and sodium silicate solutions, to each other and to the perlite particles, being effective to coat and seal the perlite particles to enhance the structural characteristics thereof.

2. A method according to claim 1 wherein said acid solutions and sodium silicate solution are sprayed onto a moving stream of perlite particles.

3. A method according to claim 1 wherein said acid solutions consist of acetic acid having a concentration of from 10 to 40 percent by weight.

4. A method according to claim 3 wherein the amount of acetic acid solution used in each of the first and third steps is about 4 ounces per cubic foot of perlite particles.

5. A method according to claim 4 wherein the sodium silicate solution has from 35 to 40 percent solids and a Baume from 40 to 45 and the amount applied is about one-half gallon per cubic foot of perlite particles.

6. A method according to claim 5 wherein the moistened particles are dried by subjecting them first to a temperature of from 720°F to 750°F and then to a temperature of from 480°F to 500°F.

7. A method of forming a building tile or the like characterized by the steps of:
    applying an aqueous acid solution to fine expanded perlite particles;
    applying an aqueous solution of sodium silicate to the moistened fine particles;
    applying an aqueous acid solution to the moistened fine particles;
    drying the fine particles and storing;
    the concentrations and proportions of said acid and sodium silicate solutions, to each other and to the perlite particles, being effective to coat and seal the perlite particles to enhance the structural characteristics thereof;

applying an aqueous acid solution to coarse expanded perlite particles;

applying an aqueous solution of sodium silicate to the moistened coarse particles;

applying an aqueous acid solution to the moistened coarse particles;

drying the coarse particles and storing;

the concentrations and proportions of said acid and sodium silicate solutions, to each other and to the perlite particles, being effective to coat and seal the perlite particles to enhance the structural characteristics thereof;

thereafter applying an aqueous acid solution to a blend of the dried fine and coarse particles;

applying an aqueous solution of sodium silicate to the moistened blended particles;

applying an aqueous acid solution to the moistened blended particles;

placing the moistened blended particles into a mold and forming the same into a tile shape under pressure; and then drying the molded tile, the concentrations and proportions of said acid and sodium silicate solutions, to each other and to the perlite particles, being effective to coat and seal the perlite particles to enhance the structural characteristics thereof, said acid solutions being selected from a group consisting of acetic, hydrochloric, phosphroic, nitric, sulfuric, boric, formic, propionic, butanoic, malic, and citric acids.

8. A method according to claim 7 wherein each of said solutions is sprayed onto a moving stream of perlite particles.

9. A method according to claim 7 wherein said acid solutions consist of acetic acid having a concentration of from 10 to 40 percent by weight and said sodium silicate solution has from 35 to 40 percent solids and a Baume from 40 to 45.

10. A method according to claim 9 wherein the amount of acetic acid solution applied is in each step about 4 ounces per cubic foot of perlite particles and the amount of sodium silicate solution applied is in each step about one-half gallon per cubic foot of perlite particles.

11. A composition of matter consisting of:

substantially dry expanded perlite particles coated and sealed with the reaction product of waterglass in contact with a first aqueous acid solution and a second acid solution in contact with the waterglass, the concentrations and proportions of the waterglass and acid solutions, to each other and to the expanded perlite particles, being effective to coat and seal the perlite particles to enhance the structural characteristics thereof, said acid solutions being selected from a group consisting of acetic, hydrochloric, phosphoric, nitric, sulfuric, boric, formic, propionic, butanoic, malic and citric acids.

12. A composition as in claim 11 wherein said acid solutions consist of acetic acid having a concentration of from 10 to 40 percent by weight and said waterglass consists of a sodium silicate solution having from 35 to 40 percent solids and a Baume from 40 to 45.

13. A composition as in claim 12 wherein said first acid solution is present in the proportion of about 4 ounces per cubic foot of perlite particles, said sodium silicate solution is present in the proportion of about one-half gallon per cubic foot of perlite particles and said second acid solution is present in the proportion of about 4 ounces per cubic foot of perlite particles.

* * * * *